(12) United States Patent
Ziskovsky et al.

(10) Patent No.: US 9,908,515 B2
(45) Date of Patent: Mar. 6, 2018

(54) DRIVE ASSEMBLY WITH MULTI-FUNCTION ACTUATOR FOR MOTOR AND BRAKE CONTROL

(71) Applicant: DEERE & COMPANY, Moline, IL (US)

(72) Inventors: Darren J. Ziskovsky, Dubuque, IA (US); Austin B. Stephens, Coffeyville, KS (US)

(73) Assignee: Deere & Company, Moline, IL (US)

( * ) Notice: Subject to any disclaimer, the term of this patent is extended or adjusted under 35 U.S.C. 154(b) by 171 days.

(21) Appl. No.: 14/754,527

(22) Filed: Jun. 29, 2015

(65) Prior Publication Data
US 2016/0377135 A1    Dec. 29, 2016

(51) Int. Cl.
*F16D 65/14*     (2006.01)
*B60T 1/06*     (2006.01)
(Continued)

(52) U.S. Cl.
CPC .............. *B60T 1/062* (2013.01); *B60T 13/04* (2013.01); *F16D 55/36* (2013.01); *F16D 65/186* (2013.01);
(Continued)

(58) Field of Classification Search
CPC ........ F16H 61/47; F16H 61/431; F16D 55/40; F16D 2121/12; F16D 2121/06;
(Continued)

(56) References Cited

U.S. PATENT DOCUMENTS

| 4,335,514 A | * | 6/1982 | Overy | ................. | B27B 17/083 |
| | | | | | 30/382 |
| 4,951,551 A | * | 8/1990 | Arai | .................... | F03C 1/0694 |
| | | | | | 91/506 |

(Continued)

FOREIGN PATENT DOCUMENTS

| DE | 60013061 T2 | 9/2005 |
| DE | 60019685 T2 | 10/2005 |

(Continued)

OTHER PUBLICATIONS

Manring et al., "Increasing the Power Density for Axial-Piston Swash-Plate Type Hydrostatic Machines," Journal of Dynamic Systems, Measurement, and Control, vol. 135, pp. 071002-1-071002-6, ASME Jul. 2013.

(Continued)

*Primary Examiner* — Bradley King
*Assistant Examiner* — Stephen Bowes
(74) *Attorney, Agent, or Firm* — Lorenz & Kopf, LLP (57) ABSTRACT

A drive assembly has a drive motor at least in part contained in a housing and having a rotor rotating an output shaft. A selector mechanism is movable into one of a plurality of orientations corresponding to one of a plurality of drive motor settings. A brake assembly is configured to couple to the rotor of the drive motor and is moveable between a braked position in which the brake assembly impedes rotation of the rotor and a released position in which the brake assembly allows rotation of the rotor. An actuator is arranged in the housing to engage the brake assembly at least when the brake assembly is in the braked position and to engage the selector mechanism at least when the brake assembly is in the released position.

20 Claims, 7 Drawing Sheets

(51) Int. Cl.
*B60T 13/04* (2006.01)
*F16D 55/36* (2006.01)
*F16D 65/18* (2006.01)
*F16D 121/12* (2012.01)
*F16D 121/14* (2012.01)
*F16D 121/06* (2012.01)

(52) U.S. Cl.
CPC ...... *F16D 2121/06* (2013.01); *F16D 2121/12* (2013.01); *F16D 2121/14* (2013.01)

(58) Field of Classification Search
CPC ............ F16D 2055/0058; F15B 15/262; F04B 1/328; F04B 1/326; F04B 1/324; F04B 1/322; F04B 1/32; F04B 1/295; F04B 1/28; F04B 1/22; F04B 1/141; F03C 1/0692; F03C 1/0686; F03C 1/0678; F01B 3/106; F01B 3/007; E02F 9/2296; E02F 9/2075; B66F 9/07572; B60W 10/188; B60W 10/182; B60W 10/103; B60T 1/062
USPC ...................... 91/472; 192/85.17, 221, 221.1
IPC ......................................... F03C 1/253,001/253
See application file for complete search history.

(56) References Cited

U.S. PATENT DOCUMENTS

| | | | |
|---|---|---|---|
| 5,904,043 A | 5/1999 | Nagatomo | |
| 6,189,669 B1 * | 2/2001 | Kremer | F16D 25/0638 188/264 E |
| 6,334,512 B1 * | 1/2002 | Forster | B60K 7/0015 188/71.5 |
| 6,405,835 B1 * | 6/2002 | Satou | B60T 1/065 188/170 |
| 2006/0144651 A1 * | 7/2006 | Grimm | F16D 55/40 188/71.5 |
| 2007/0175714 A1 * | 8/2007 | Saibold | B60T 13/22 188/170 |
| 2013/0180809 A1 * | 7/2013 | Yabuuchi | F16D 55/36 188/71.5 |
| 2013/0190129 A1 * | 7/2013 | Hoots | F16D 55/36 475/331 |

FOREIGN PATENT DOCUMENTS

| | | | | |
|---|---|---|---|---|
| EP | 1116899 A2 | | 7/2001 | |
| EP | 2806153 A1 | | 11/2014 | |
| FR | 2487922 A1 | * | 2/1982 | ............ F03C 1/0678 |
| GB | 906357 A | * | 9/1962 | ............ F01B 3/0032 |
| JP | 2006009721 A | * | 1/2006 | |
| JP | 2010174690 A | * | 8/2010 | |

OTHER PUBLICATIONS

Manring et al., "Scaling the Speed Limitations for Axial-Piston Swash-Plate Type Hydrostatic Machines," Journal of Dynamic Systems, Measurement, and Control, vol. 136, pp. 031004-1-031004-8, ASME May 2014.

* cited by examiner

DRIVE ASSEMBLY WITH MULTI-FUNCTION ACTUATOR FOR MOTOR AND BRAKE CONTROL

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to drive assemblies, including drives having an integral motor for transmitting rotational power to an output hub.

BACKGROUND OF THE DISCLOSURE

In various applications, a drive assembly may be utilized to provide rotational power to various components. In various wheeled or tracked vehicles, for example, a final drive assembly may be mounted to a frame of the vehicle to provide rotational power, at an output hub of the drive assembly, to drive the wheels or tracks of the vehicle, and thereby move the vehicle over terrain. Such a drive assembly (and others) may include hydraulic motors for providing rotational power, and various gears for adjusting the speed of the rotational power for output at the output hub. In some cases, the motors may be operated at one or more different speeds.

The drive assemblies may also include a park brake, such as a spring applied, hydraulically released brake, to brake the drive motor. Known designs may include one or more components to release the brake, and also may include one or more components to mechanically control the speed of the drive motor. For example, a hydraulic piston may be used to release the brake, and one or more hydraulic tilt mechanisms may be used to change motor speed by changing the degree of tilt of a swash plate impinged by one or more revolving pistons of the motor. Arranging and packaging complex assemblies such as these, along with gear trains, bearings, shafts and other drive components, in what may be relatively tight space envelop may be a challenge. Accordingly, it may be useful to provide an improved arrangement for controlling the motor and brake components of the drive assembly.

SUMMARY OF THE DISCLOSURE

A drive assembly is disclosed for transmission of power having motor and brake components operated by a common hydraulic piston.

According to one aspect of the disclosure, a drive assembly includes a housing and a drive motor at least in part contained in the housing having a rotor rotating an output shaft. A selector mechanism, at least in part contained in the housing, is movable into one of a plurality of orientations corresponding to one of a plurality of drive motor settings. A brake assembly, at least in part contained in the housing, is configured to couple to the rotor of the drive motor. A brake assembly is moveable between a braked position, in which the brake assembly impedes rotation of the rotor, and a released position, in which the brake assembly allows rotation of the rotor. An actuator, at least in part contained in the housing, is arranged to engage the brake assembly at least when the brake assembly is in the braked position and to engage the selector mechanism at least when the brake assembly is in the released position.

In certain embodiments, a drive assembly includes a housing and a hydraulic drive motor having a rotor rotating an output shaft extending along a rotation axis within the housing. A swash plate pivotally mounted with respect to the housing about the output shaft is movable into one of a plurality of tilt orientations corresponding to one of a plurality of motor speed settings. A brake assembly is configured to couple to the rotor of the drive motor and move between a braked position, in which the brake assembly impedes rotation of the rotor, and a released position, in which the brake assembly allows rotation of the rotor. An actuator piston may be acted on by one or more of a plurality of hydraulic pressure streams from corresponding one or more of a plurality of pressure cavities to engage the brake assembly at least when the brake assembly is in the braked position and to engage the selector mechanism at least when the brake assembly is in the released position.

In certain other embodiments, a drive assembly for a final drive of a work vehicle includes a mounting hub configured to secure to a frame of the work vehicle. A drive motor, having an output shaft, is attached to the mounting hub. A swash plate is pivotally mounted with respect to the mounting hub about the output shaft and movable into one of a plurality of tilt orientations corresponding to one of a plurality of motor speed settings. A brake assembly is configured to couple to the rotor of the drive motor and move between a braked position, in which the brake assembly impedes rotation of the rotor, and a released position, in which the brake assembly allows rotation of the rotor. An actuator piston may be acted on by one or more of a plurality of hydraulic pressure streams from corresponding one or more of a plurality of pressure cavities to engage the brake assembly at least when the brake assembly is in the braked position and to engage the selector mechanism at least when the brake assembly is in the released position. A gear set is coupled to the output shaft, and an output hub receives rotational power from the motor via the output shaft and the gear set to provide motive power for the work vehicle. When the brake assembly is in the released position, the output hub may be driven at a first speed and torque when the swash plate is in a first tilt position, and the output hub may be driven at a second speed and torque when the swash plate is in a second tilt position.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed drive assembly, as shown in the accompanying figures of the drawings described briefly above. Various modifications to the example embodiments may be contemplated by one of skill in the art.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally parallel with the rotational axis of the shaft.

Also as used herein, "radially" aligned may refer to two components that are both disposed along a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

The disclosure may generally be thought of as providing an improved motor setting selection and brake control arrangement for fluid powered drives, such as hydraulic or pneumatic drives. Such drives may be used to deliver power in various applications, including, for example, to power various sub-components of work vehicles and implements. As one non-limiting example, the drive assembly may be a final drive arrangement for providing motive power to the wheels or track rollers for travel of various work vehicles, such as wheeled or tracked loaders, sprayers, graders and various other agricultural, construction and forestry machines.

The disclosure may also provide an arrangement for reducing the part count and complexity of the drive assembly by using a single actuation component to both select the motor setting and to control the brake. As non-limiting examples, the motor may be a hydraulic motor, as is understood in the art, and the motor setting may be considered one or more of the output speed and torque of the motor, or as the physical displacement of the hydraulic fluid in the motor, which in turn affects the output speed and torque. The brake may be controlled by the actuator to brake the motor or to release braking of the motor, depending on whether the brake is normally applied or released. A spring applied, hydraulically released brake, for example, my be normally applied by spring force to brake the motor, in which case the actuator may be used to release the brake by overcoming the spring force.

The actuator may be any suitable component that serves this dual function and fits into the space envelope of the drive. In one non-limiting example, the actuator may be a hydraulically actuated piston. The piston may be configured and arranged in the drive to apply multiple discrete pressures onto the piston, either individually or in the aggregate. For example, two pressures may be applied to the piston, including a first pressure to release the brake and a second pressure to perform a motor setting selection. The first and second pressures may be applied individually, that is, one at a time in consecutive fashion, or the two pressures may be applied simultaneous during one or both of the operations. Thus, the force of the pressure may be singularly sufficient to perform one of the operations, or the forces may need to be summed in order to perform one or more of the operations. In either case, the pressures may be applied to separate, isolated pressure surfaces from separate, isolated pressure cavities.

In certain embodiments, the piston may have multiple pressure surfaces arranged on the outer periphery of the piston. For example, the piston may be an annular body with a stepped outer periphery in which radial surfaces of the steps are spaced apart along the axis of rotation and which are at different distances from the axis of rotation. The stepped outer periphery of the piston may be arranged in close proximity to a stepped interior surface of the drive housing, such as a motor hub. Small gaps between the stepped surfaces define the pressure cavities, which receive working fluid. The pressure cavities are sealed so that when flooded with pressurized working fluid sufficient pressure acting on the pressure surfaces of the piston may translate the piston axially along the axis of rotation. The piston movement then effects the motor selection and brake control operations. For example, in one position, the piston may unseat from the brake, overcoming the spring force normally maintaining engagement of the piston with the brake. In another position, for example, the piston changes the tilt of a swash plate, which changes the displacement of the motor, and thereby the rotational speed and torque output through the output shaft.

In certain embodiments, the piston may have multiple pressure surfaces arranged on the face of the piston. For example, the piston may be an annular body with multiple concentric annular rings extending axially from the face of the piston, the radial faces of the annular rings defining pressure surfaces at different distances from the axis of rotation. The face of the piston may be arranged in close proximity to annular grooves in an interior surface of the drive housing, such as a motor hub. Small gaps between the annular rings and grooves define the pressure cavities, which receive working fluid. The pressure cavities are sealed so that when flooded with pressurized working fluid sufficient pressure acting on the pressure surfaces of the piston may translate the piston axially along the axis of rotation. The piston movement then effects the motor selection and brake control operations, for example in the manner noted in the preceding paragraph.

Figure 1:
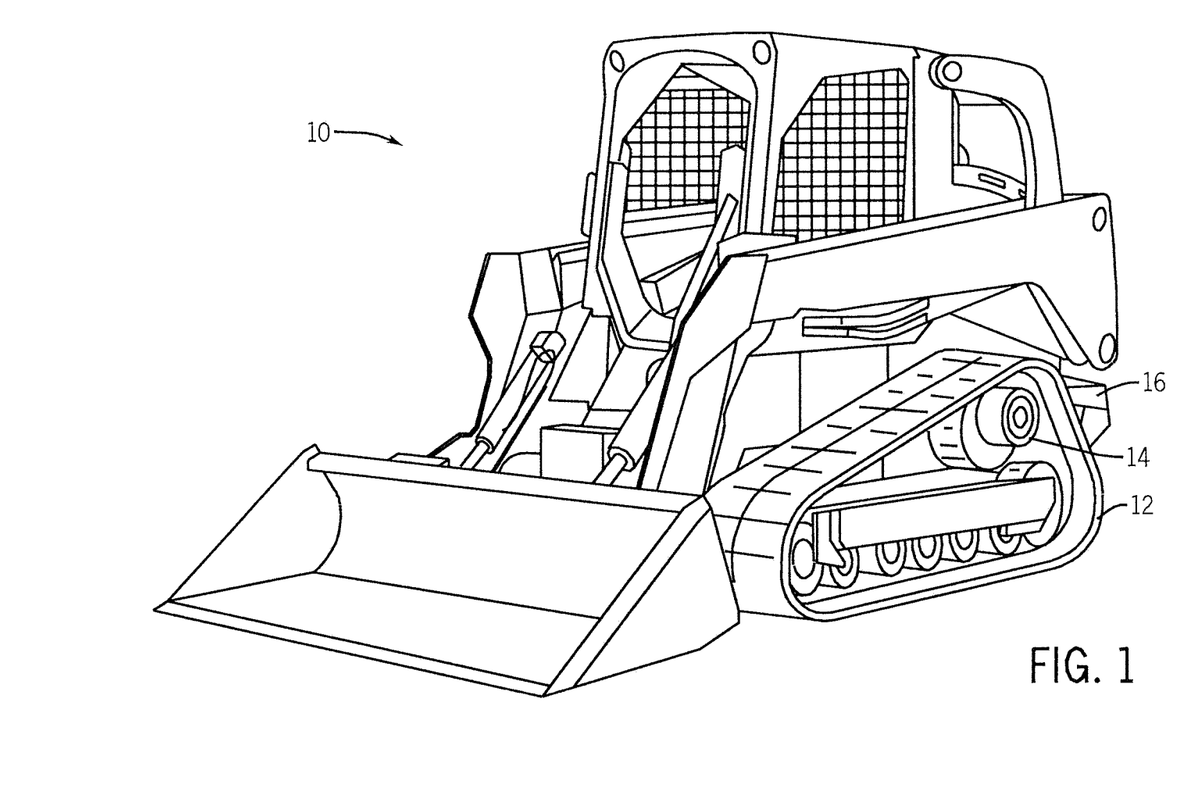
FIG. 1 is perspective view of an example vehicle with which a drive assembly according to the present disclosure may be implemented.

Referring now to the figures, the disclosed drive assembly may be utilized with an example work vehicle 10, as shown in FIG. 1. As depicted, the work vehicle 10 may be a compact track loader with ground-engaging tracks 12. An example drive assembly 14 is configured as a final drive assembly that is mounted to a frame 16 of the work vehicle 10 in order to provide motive power to the tracks 12. It will be understood that the depicted work vehicle 10 is presented as an example only, and that the disclosed drive assembly (e.g., the drive assembly 14) may be utilized with other vehicles (or other machines), for example, including any vehicle where the motive power is provided by one or more hydraulic final drives. Further, it will be understood that the disclosed drive assembly may be utilized as a final drive assembly (e.g., as depicted for the drive assembly 14) for providing motive power to a ground-engaging element (e.g., wheels, etc.) of a vehicle, or may be utilized to provide rotational power to other types of devices.

Figure 2:
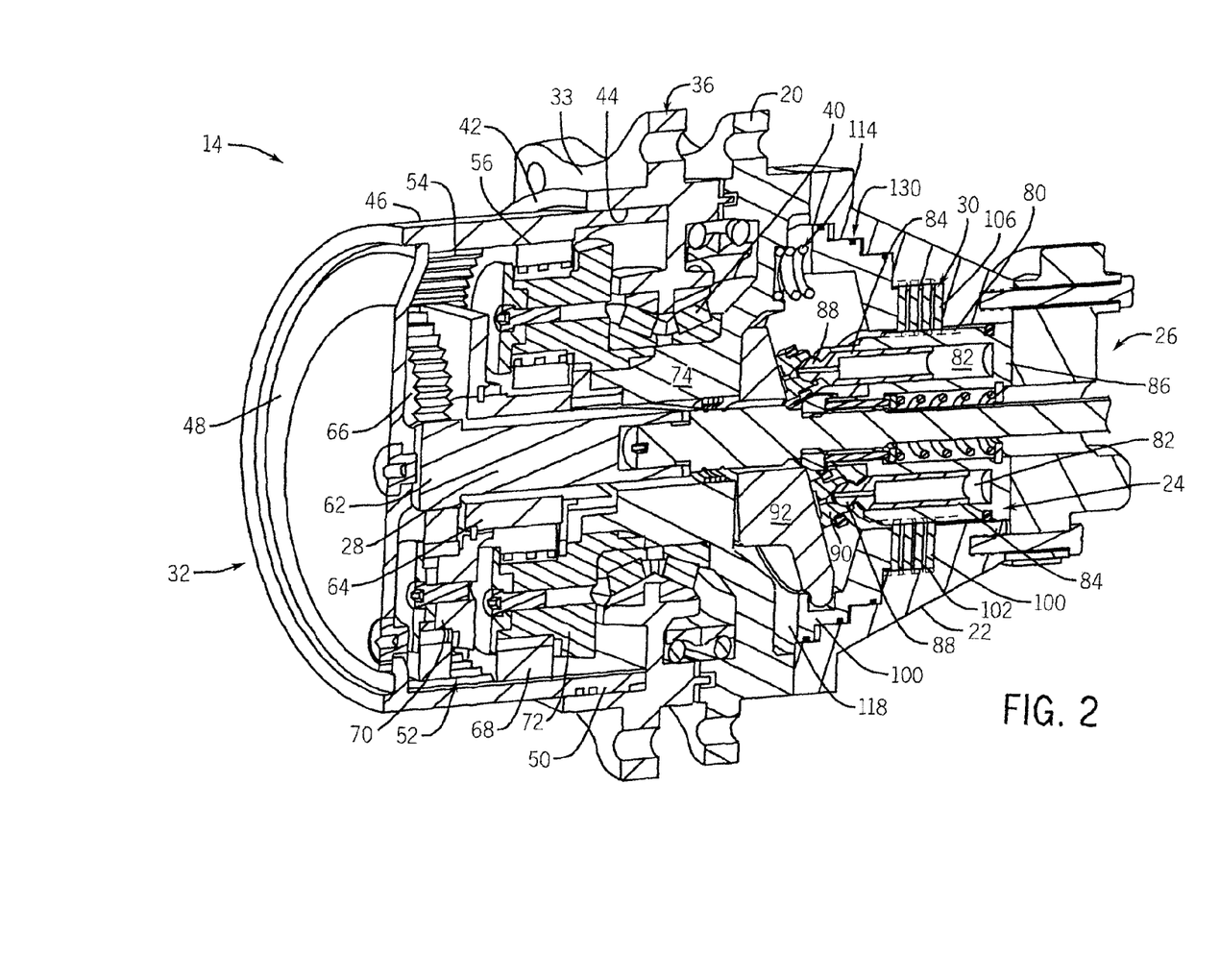
FIG. 2 is a perspective, sectional view of an example drive assembly according to the present disclosure, for use with the vehicle of FIG. 1.

Referring also to FIG. 2, an example configuration of the drive assembly 14 is presented. Various components (or assemblies) of the drive assembly 14 may generally exhibit radial symmetry, such that for these components the sectional view depicted in FIG. 2 may represent a view of any number of diametric planes through the drive assembly 14. In certain embodiments, the disclosed drive assembly may exhibit various radial asymmetries.

As depicted, the example drive assembly 14 may include a mounting hub 20 configured for attachment to the frame 16 of the work vehicle 10, and thus may be utilized as a final drive assembly for driving the tracks 12 of the work vehicle 10. The mounting hub 20 is included as part of a larger housing or mounting structure 22 for the drive assembly 14, which may be generally configured to remain relatively stationary during operation of the drive assembly 14. A motor 24 may be attached to the mounting structure 22, or motor housing, (and, thereby, to the mounting hub 20) at one axial end 26 of the drive assembly 14, such that the motor 24 may be held in an appropriately stationary orientation for delivery of rotational power to various external devices (e.g., the tracks 12 of FIG. 1). In FIG. 2, the motor 24 is configured as a hydraulic motor with a brake assembly 30, and an output shaft 28 extending towards another axial end 32 of the drive assembly 14, as described in detail below. In other embodiments, other configurations may be possible.

The drive assembly 14 may further include an output interface. As depicted, the output interface is configured as an output hub 36, although other configurations may be possible. Generally, the output hub 36 includes a hub body 38, which may extend within the drive assembly 14 to rest on various bearings 40. The output hub 36 may also include an attachment lip 42, which extends from the hub body 38, towards the axial end 32 of the drive assembly 14, to an axial end of the attachment lip 42. Generally, the attachment lip 42 may define an undercut 44, such that an open space is provided radially inside the attachment lip 42. As depicted, the output hub 36 is configured to engage (directly or indirectly) the tracks 12 of the work vehicle 10, such that rotation of the output hub 36 may drive movement of the tracks 12 and, thereby, movement of the work vehicle 10. In other embodiments, other output interfaces may be utilized to engage with the tracks 12 or other external devices.

The drive assembly 14 may further include a housing configured to engage with the attachment lip of the relevant output interface, such that rotational power may be transmitted from the housing to the output interface via co-rotation (i.e., rotation in unison) of the housing and the output interface. As depicted, for example, a housing cylinder 46 may include and end cap 48 and a hub end 50, which is configured to attach to the output hub 36 via the attachment lip 42. The housing cylinder 46 may be attached to the mounting hub 20 by inserting the hub end 50 of the housing cylinder 46 into the undercut 44, with the attachment lip 42 generally surrounding (i.e., being radially aligned with and outside of) the hub end 50 of the housing cylinder 46.

Rotational power may be transmitted in various ways from the motor 24 to the housing cylinder 46 and thereby, via the attachment between the attachment lip 42 and the hub end 50 of the housing cylinder 46, to the output hub 36. As depicted, for example, sets of teeth 52 may be integrally (or otherwise) formed on an interior circumference of the housing cylinder 46, such that the housing cylinder 46 includes distinct interior ring gear interfaces 54 and 56. A gear set (e.g., a planetary gear set) utilizing the ring gear interfaces 54 and 56 may then be disposed within the housing cylinder 46 in order to provide an appropriate speed reduction between the rotation of the output shaft 28 (e.g., as powered by the motor 24) and the rotation of the housing cylinder 46 (e.g., as powers rotation of the output hub 36 and, thereby, the relevant external device).

As in the illustrated example, the drive assembly 14 may include an example double planetary gear set 60, with sun gears 62 and 64, sets of planet gears 66 and 68, and planet gear carriers 70 and 72. The planet gears 66 are meshed with the sun gear 62 and with the ring gear interface 54. The planet gears 68 are meshed with the sun gear 64 and with the ring gear interface 56. The planet gear carrier 70 is fixed to (e.g., secured to or integrally formed with) the sun gear 62, and the planet gear carrier 72 is fixed to (e.g., secured to or integrally formed with) an extended neck 74 of the mounting structure 22. With such a configuration, the sun gear 64 may be rotated by the planet gear carrier 70, via movement of the planet gears 66 around the sun gear 62, while the axes of rotation of the various planet gears 68 may be fixed in place via the connection between the planet gear carrier 72 and the neck 74. It will be understood, however, that other configurations may be possible.

With the depicted planetary gear set 60, rotational power may be routed from the motor 24 to the housing cylinder 46. For example, when the sun gear 62 is rotated by the motor 24 (i.e., via the output shaft 28) rotational power is transmitted by the sun gear 62, through the planet gears 66, both to the sun gear 64 (via the planet gear carrier 70) and to the housing cylinder 46 (via the ring gear interface 54). Rotational power received at the sun gear 64 is further transmitted to the housing cylinder 46 via the planet gears 68, being facilitated by the fixed connection between the planet gear carrier 72 and the neck 74, and the ring gear interface 56. Due to the attachment between the housing cylinder 46 and the output hub 36, rotational power from the housing cylinder 46 may then be transmitted to the output hub 36, and thereby, to the relevant external device. As depicted, the ring gear interfaces 54 and 56 are disposed on the housing cylinder 46 such that, when the hub end 50 of the housing cylinder 46 is attached to the output hub 36 via the attachment lip 42, the ring gear interfaces 54 and 56 are not radially aligned (i.e., do not axially overlap) with the attachment lip 42. Further, the planetary gear set 60 is configured such that the various sun and planet gears are also not radially aligned with the attachment lip 42 when the housing cylinder 46 is attached to the output hub 36. In other embodiments, other configurations may be possible.

Figure 3:
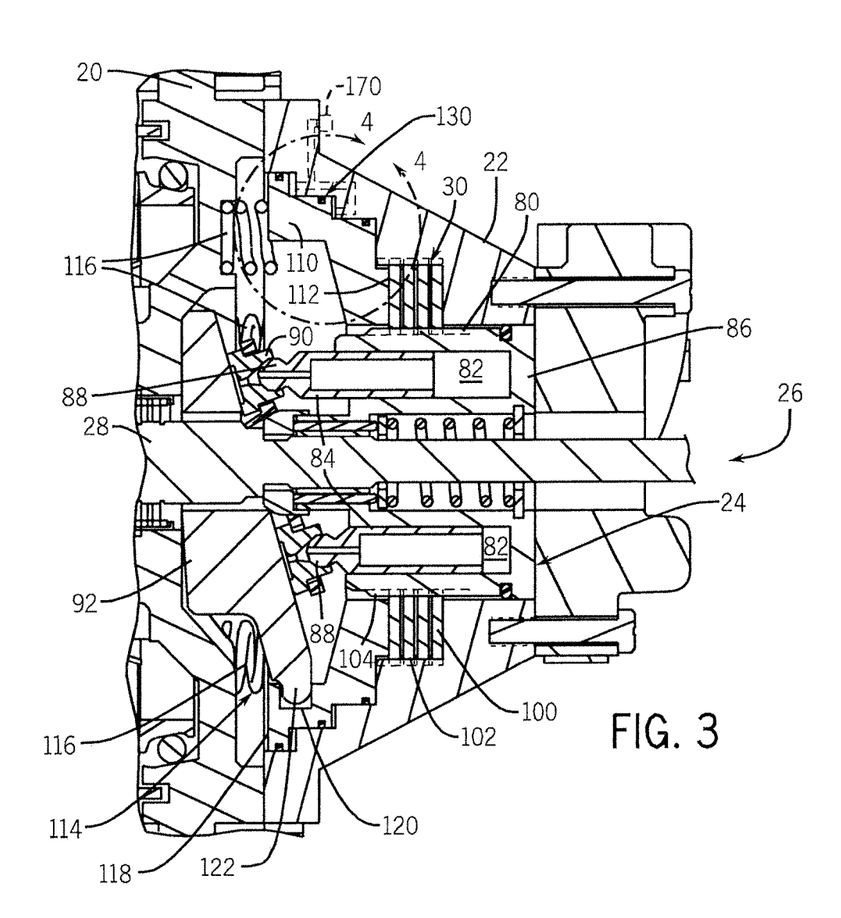
FIG. 3 is partial side sectional view of an example motor and brake arrangement of the drive assembly of FIG. 2.

Referring also to FIG. 3, the motor and brake arrangement and operation will now be described. As mentioned, the motor 24 may be mounted within the mounting structure 22 at the axial end 26 of the drive assembly 14. The motor 24 may be a hydraulic motor with its output shaft 28 extending towards axial end 32 of the drive assembly 14. The motor may have an annular cylinder block or rotor 80, which is mounted for co-rotation with an integral rod end of the output shaft 28. Cylinder chambers 82 may be spaced about the rotor generally parallel to the output shaft 28. The cylinder chambers 82 hold pistons 84 that each have end that reciprocates in the cylinder chambers 82. Hydraulic oil or other working fluid under pressure enters the cylinder chambers 82 through one or more ports (not shown) in a valve plate 86 at one end of the rotor 80. Filling the open volume in the cylinder chambers 82 with hydraulic fluid drives the pistons 84 to extend out from the rotor 80, while withdrawing the hydraulic fluid allows the pistons 84 to retract, as is understood in the art. The pistons 84 may have free ends 88, which may be fixed with rollers or other friction-reducing members, that engage a shoe 90 of a swash plate 92 that is adjustably mounted (e.g., by ball connections 94 of the mounting hub 20 (see FIG. 7)) to pivot about a tilt axis, which is at an angle to the rotational axis of the motor 24. The pistons 84, in effect, push the swash plate 92, by engagement of the free ends 88 with the shoe 90, to rotate the rotor 80.

The brake assembly 30, which may be in the form of a spring-applied, hydraulically-released park brake assembly, is coupled to the rotor 80. For example, as in the illustrated example, the brake assembly 30 may include four annular brake discs 100 that rotate with the rotor 80 and three annular friction discs 102 that are attached to the mounting structure 22. The attachment of the brake discs 100 to the rotor 80 and the friction discs 102 to the mounting structure 22 may be made in any suitable manner. For example, the brake discs 100 may have teeth (not shown) spaced along its inner periphery that engage axially-running splines 104 on the outer periphery of the rotor 80. Engagement of the teeth of the brake discs 100 with the splines 104 of the rotor 80 cause the brake discs 100 to rotate with the rotor 80 as it turns. The mounting structure 22 has an annular brake flange 106 against which abuts an outer one of the brake discs 100 when the brake assembly 30 is braked. This arrests the gross axial movement of the brake discs 100, such that facial surfaces of the brake discs 100 move into abutting relation with the interleaved friction discs 102, which, with the application of sufficient axial force, use frictional force to slow and stop rotation of the brake discs 100, and thereby the rotor 80.

Figure 7:
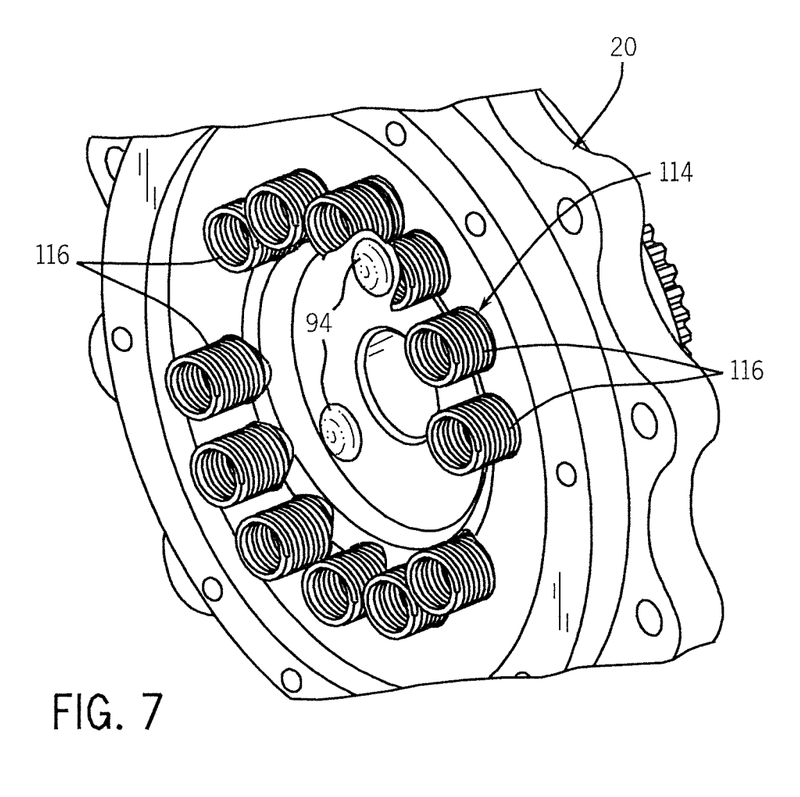
FIG. 7 is a perspective view showing an example spring arrangement for the drive assembly of FIG. 2.

Actuation and release of the brake assembly, as well as selection of the tilt orientation of the swash plate 92, may be accomplished, at least in part, by or through a dual-purpose actuator element. For example, as illustrated, a single actuator piston 110 may be a relative large annular component disposed about the rotor 80 and the swash plate 92. At an outer axial end, the actuator piston 110 may have an annular brake flange 112 which is oriented to engage an inner one of the brake discs 100 when the brake assembly 30 is braked. A spring, or more aptly, a spring arrangement 114 engaging the actuator piston 110 is configured, in the absence of countering hydraulic pressure, to engage and apply an axial force to the actuator piston 110, which, when the brake flange 112 engages the brake assembly 30, moves the brake discs 100 axially into frictional engagement with the friction discs 102, to slow and stop the rotor 80, as described above. The spring arrangement 114 may be as shown in FIG. 7, including an array of twelve springs 116 arranged about the output shaft 28 and held in recessed pockets (not shown) in the mounting hub 20 and oriented to engage an spring flange 118 at an axial inner end of the actuator piston 110. The count and type of springs in the spring arrangement 114 may vary to provide the desired spring length and rate, including various single and dual rate helical coil and Belleville springs.

At the inner axial end, the actuator piston 110 may have an annular groove 120 that receives a portion 122 of the outer periphery of the swash plate 92. Alternatively or additionally, the swash plate 92 (or the actuator piston 110) may have a projection (e.g., a ball or pin member) and the actuator piston 110 (or the swash plate 92) may have a pocket (e.g., recessed socket) that receives the projection. By way of the grooved connection or the pin and socket connection, axial movement of the actuator piston 110 toward the axial end 32 may counter the spring force of the spring arrangement 114 to release the brake assembly 30.

Additionally, and also by way of the grooved connection or the pin and socket connection, axial movement, in either direction, of the actuator piston 110 may effect a change in tilt orientation of the swash plate 92. Changing the swash plate 92 tilt in turn effects the operation of the motor 24, as is understood in the art. Specifically, when the swash plate 92 is at an increased tilt angle with respect to the tilt axis (e.g., normal or oblique to the rotation axis of the motor), the stroke of the pistons 84 increases, which raises the displacement, or volume of pressurized fluid in the cylinder chambers 82, and causes the rotor 80, and thereby the output shaft 28, to rotate a relatively low speed with a relatively high torque. Conversely, when the swash plate 92 is a decreased tilt angle, yet above normal to the rotation axis of the motor 24, the piston stroke decreases, which lowers the displacement, or volume of pressurized fluid in the cylinder chambers 82, and causes the rotor 80, and thereby the output shaft 28, to rotate a relatively high speed with a relatively low torque. In this way, the actuator piston 110 serves the dual purposes of releasing the brake assembly 30 and selecting a speed/torque setting of the motor 24 by changing the position of the swash plate 92, which acts a selector mechanism.

Axial movement of the actuator piston 110 toward the axial end 32, for example, to release the brake assembly 30 and decrease the tilt angle of the swash plate 92, may be accomplished by applying hydraulic pressure directly to the actuator piston 110 at a pressure surface arrangement 130 of the actuator piston 110. While the configuration of the pressure surface arrangement 130 may take various forms, it may be desirable to have at least two isolated pressure surfaces that may be acted upon individually or in the aggregate to provide varying forces for different axial movement of the actuator piston 110 under constant system pressure operating conditions.

Figure 4:
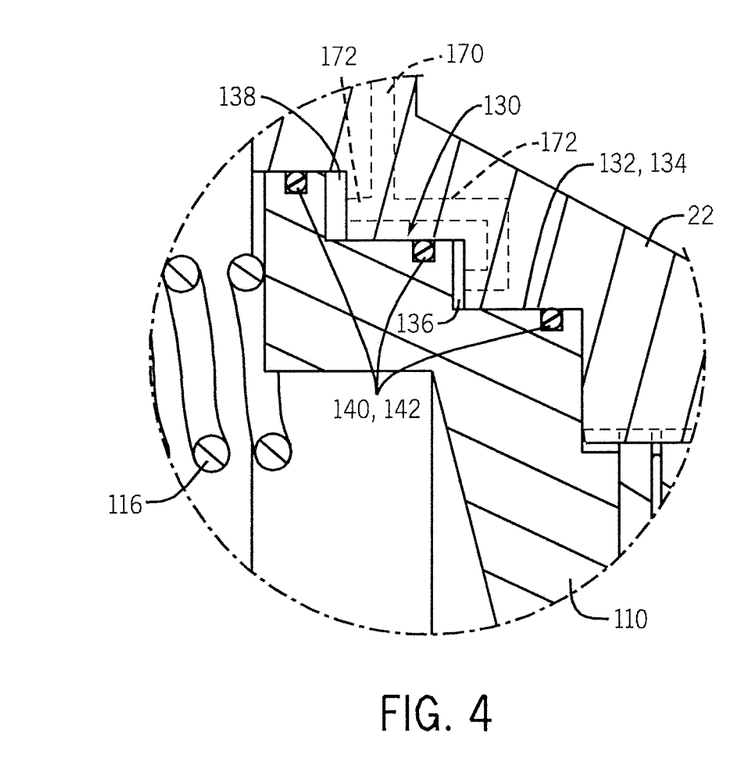
FIG. 4 is an enlarged view of the area 4-4 of FIG. 3 showing an example piston configuration.

Referring now also to FIG. 4, in one configuration, the pressure surface arrangement 130 may be in the form a stepped outer periphery 132 of the actuator piston 110 and a corresponding stepped inner periphery 134 of the mounting structure 22. As shown, the stepped peripheries 132, 134 have define three or more inner diameters defining two or more pressure cavities 136 and 138. Each pressure cavity 136, 138 is sealed from the other and the surrounding environment by three O-rings 140 disposed in annular grooves 142 formed in either the actuator piston 110 or the mounting structure 22.

Figure 5:
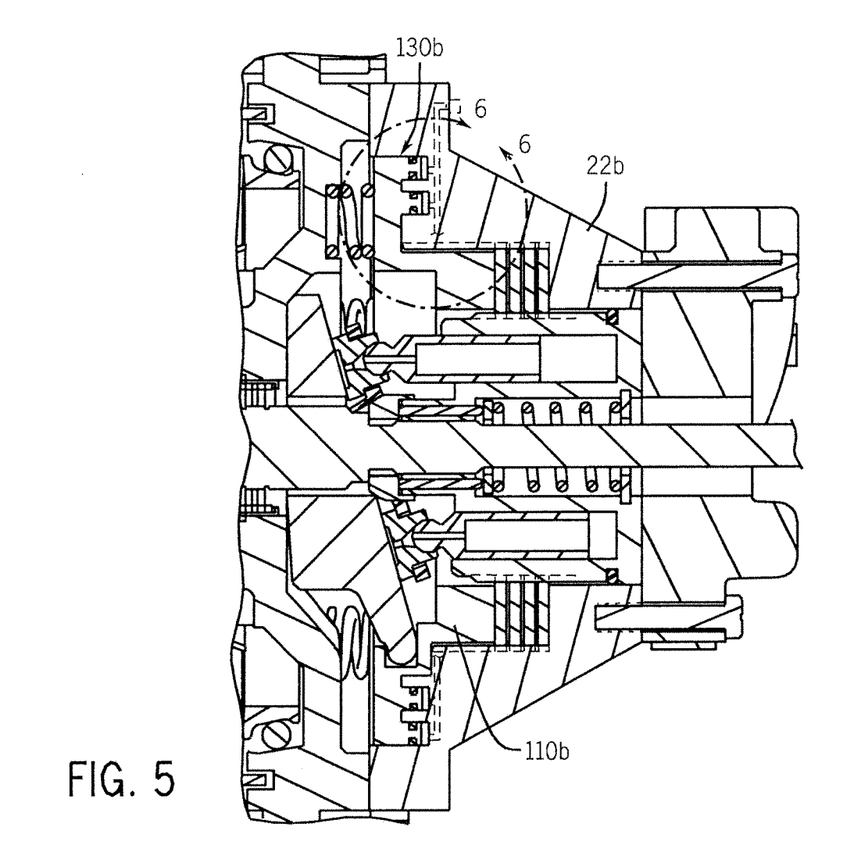
FIG. 5 is a partial side sectional view of another example motor and brake arrangement of the drive assembly of FIG. 2.
Figure 6:
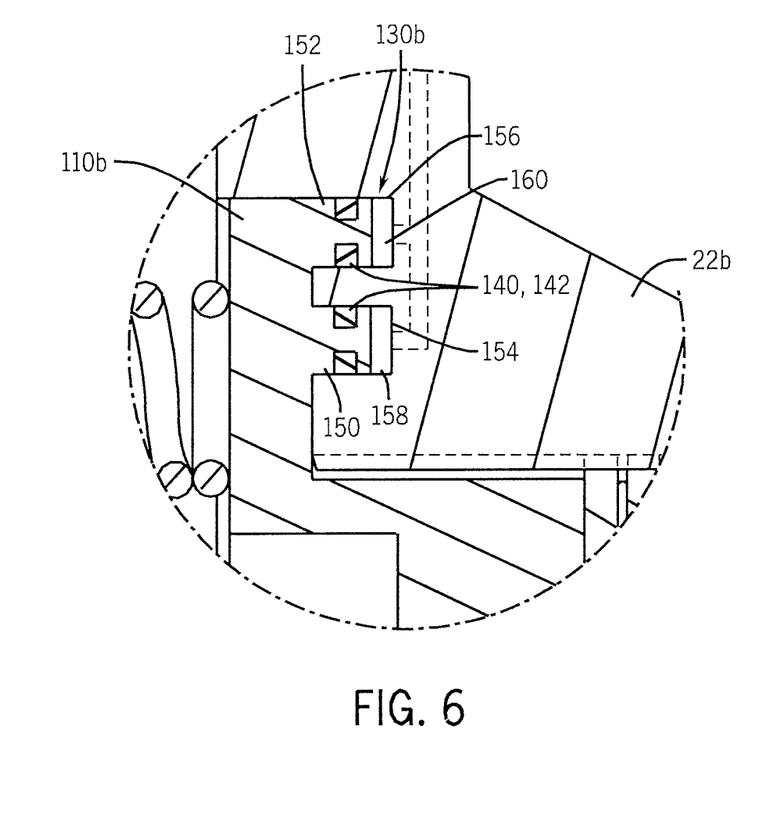
FIG. 6 is an enlarged view of the area 6-6 of FIG. 5 showing an example piston configuration.

Referring now to FIGS. 5 and 6, another example embodiment of the pressure surface arrangement 130b is shown, including an actuator piston 110b and mounting structure 22. As depicted, the pressure surface arrangement 130b is formed by two spaced apart annular rings 150 and 152 extending from the actuator piston 110b toward the axial end 26. The mounting structure 22 defines two concentric recesses 154 and 156 configured to receive the rings 150, 152, respectively. Respective pressure cavities 158 and 160 are formed therebetween and sealed by O-rings 140b in grooves 142b in either the actuator piston 110b or the mounting structure 22.

In both of the illustrated example pressure surface arrangements 130, 130b, there are multiple pressure cavities, in particular two annular pressure cavities of differing diameter. These configuration provide for two pressure forces to act on the actuator piston 110, 110b. The applicable forces are dependent on the size of annulus of the pressure cavities. The area of primary importance thus may be the diameters of the pressure cavities, such that the axial spacing of the pressure cavities may be less critical, provided it is some non-zero gap dimension.

As one example of operation with regard to the FIG. 4 arrangement, the smaller diameter inner pressure cavity 136 may be used to move the actuator piston 110 axially to counter the spring arrangement 114 to release the brake assembly 30, while the larger diameter outer pressure cavity 138 is used to change the tilt angle of the swash plate 92. Further to this example, the pressure cavity 138 may be used to move the swash plate 92 into a position corresponding to a low displacement (high speed/low torque) motor operation condition. A high displacement (low speed/high torque) motor operation condition may be achieved as a default using the spring arrangement 114, which, as described, may also provide park brake activation.

Fluid delivery to the pressure cavities in each of the illustrated examples, and others, may be by a single inlet port passage 170 for both cavities before branching off to each pressure cavity via passages 172. Moreover, due to the relative size and location of the actuator piston 110 with respect to the mounting structure 22, the pressure surface arrangements 130 may be positioned close to the outside of the drive assembly 14. These features allow for minimal, and relatively uncomplicated, hydraulic porting and routing through the drive assembly 14 being required for controlling the park brake and motor selection functions.

It should be noted that the motor selection may be achieved by moving the swash plate 92 into one of two or more distinct swash plate tilt orientations in step-wise or on-off fashion, or by a generally continuous or infinite tilt angle adjustment with corresponding motor operation settings. Hydraulic pressure control allows for the latter readily by changing system pressure. Otherwise, the pressure surface arrangement 130 and/or the spring arrangement 114 would need to be selected and configured appropriately to match the desired motor selection and brake actuation/release functionality desired. As one non-limiting example, the actuator and the mounting structure may be configured to include one or more additional pressure cavities in order to provide for one or more additional motor operation selections. Also, it should be understood that the disclosed arrangement could be used to apply the brake assembly when overcoming the spring arrangement in brake assemblies other than park brake assemblies.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly, comprising:
   a housing;
   a drive motor at least in part contained in the housing and having a rotor rotating an output shaft;
   a swash plate at least in part contained in the housing and movable into one of a plurality of orientations corresponding to one of a plurality of drive motor settings;
   a brake assembly at least in part contained in the housing and configured to couple to the rotor of the drive motor, the brake assembly moveable between a braked position in which the brake assembly impedes rotation of the rotor and a released position in which the brake assembly allows rotation of the rotor; and
   an actuator at least in part contained in the housing and arranged to engage the brake assembly at least when the brake assembly is in the braked position and to engage the swash plate at least when the brake assembly is in the released position.

2. The drive assembly of claim 1, wherein the actuator is a hydraulic actuator acted on by a plurality of hydraulic pressure streams from a corresponding plurality of pressure cavities.

3. The drive assembly of claim 2, wherein the actuator is an annular piston having a central opening and arranged about the drive motor.

4. The drive assembly of claim 3, wherein the actuator piston includes a plurality of pressure surfaces; and
   wherein the plurality of pressure cavities are defined between the plurality of pressure surfaces and the housing.

5. The drive assembly of claim 4, wherein the plurality of pressure surfaces are formed by a stepped peripheral surface of the actuator piston.

6. The drive assembly of claim 5, wherein at least one of the actuator piston and the housing has at least one radial facing groove retaining at least one seal isolating the plurality of pressure cavities from one another.

7. The drive assembly of claim 4, wherein the plurality of pressure surfaces are formed by concentric rings of the actuator piston.

8. The drive assembly of claim 7, wherein the plurality of pressure cavities are separated by annular rings of the housing and such that at least one of the plurality of pressure cavities is radially spaced from a rotation axis of the drive motor farther than another of the plurality of pressure cavities; and wherein at least one of the actuator piston and the housing has at least one radial facing groove retaining at least one seal isolating the plurality of pressure cavities from one another.

9. The drive assembly of claim 4, wherein the housing has an inlet port; and
wherein hydraulic fluid is communicated to the plurality of pressure cavities from the inlet port.

10. The drive assembly of claim 2, wherein the drive motor is a hydraulic motor and the swash plate is pivotally coupled with respect to the housing to be moved by the actuator into one of a plurality of tilt orientations with respect to a rotation axis of the motor; and
wherein the swash plate has a work surface at an oblique angle with respect to the rotation axis, the work surface impinged by one or more pistons of the drive motor such that a stroke of each of the pistons is different for each of the plurality of tilt orientations of the swash plate.

11. The drive assembly of claim 10, wherein the at least one of the swash plate and the actuator piston includes a portion that is received in a groove in the other of the swash plate and the actuator piston.

12. The drive assembly of claim 11, wherein the the portion extends from the swash plate.

13. The drive assembly of claim 3, wherein the brake assembly includes a plurality of interleaved brake discs and friction plates arranged about the rotor of the drive motor, the brake discs being coupled for rotation with the rotor of the drive motor and the friction plates being mounted in fixed relation to the housing; and
wherein, at least in the braked position of the brake assembly, the piston engages at least one of the brake discs and the friction plates so that the friction plates frictionally engage the brake discs to impede rotation of the brake discs and the rotor of the drive motor.

14. A drive assembly, comprising:
a housing;
a hydraulic drive motor having a rotor rotating an output shaft extending along a rotation axis within the housing;
a swash plate pivotally mounted with respect to the housing about the output shaft and movable into one of a plurality of tilt orientations corresponding to one of a plurality of motor speed settings;
a brake assembly configured to couple to the rotor of the drive motor, the brake assembly moveable between a braked position in which the brake assembly impedes rotation of the rotor and a released position in which the brake assembly allows rotation of the rotor; and
an actuator piston acted on by one or more hydraulic pressure streams from corresponding one or more pressure cavities to engage the brake assembly at least when the brake assembly is in the braked position and to engage the swash plate at least when the brake assembly is in the released position.

15. The drive assembly of claim 14, wherein the actuator piston includes a plurality of pressure surfaces; and
wherein there are multiple pressure cavities defined between the plurality of pressure surfaces and the housing.

16. The drive assembly of claim 15, wherein the plurality of pressure surfaces are formed by a stepped peripheral surface of the actuator piston.

17. The drive assembly of claim 15, wherein the plurality of pressure surfaces are formed by concentric rings of the actuator piston.

18. A drive assembly for a final drive of a work vehicle, the drive assembly comprising:
a mounting hub configured to secure to a frame of the work vehicle;
a drive motor attached to the mounting hub, the drive motor having a rotor driving an output shaft;
a swash plate pivotally mounted with respect to the mounting hub about the output shaft and movable into one of a plurality of tilt orientations corresponding to one of a plurality of motor speed settings;
a brake assembly configured to couple to the rotor of the drive motor, the brake assembly moveable between a braked position in which the brake assembly impedes rotation of the rotor and a released position in which the brake assembly allows rotation of the rotor;
an actuator piston acted on by one or more hydraulic pressure streams from corresponding one or more pressure cavities to engage the brake assembly at least when the brake assembly is in the braked position and to engage the swash plate at least when the brake assembly is in the released position;
a gear set coupled to the output shaft; and
an output hub receiving rotational power from the motor via the output shaft and the gear set to provide motive power for the work vehicle;
wherein, when the brake assembly is in the released position, the output hub is driven at a first speed and torque when the swash plate is in a first tilt position and the output hub is driven at a second speed and torque when the swash plate is in a second tilt position.

19. The drive assembly of claim 18, wherein the actuator piston includes a plurality of pressure surfaces and there are multiple pressure cavities defined between the plurality of pressure surfaces and a housing; and
wherein the plurality of pressure surfaces are formed by a stepped peripheral surface of the actuator piston.

20. The drive assembly of claim 18, wherein the actuator piston includes a plurality of pressure surfaces and there are multiple pressure cavities defined between the plurality of pressure surfaces and the housing; and
wherein the plurality of pressure surfaces are formed by concentric rings of the actuator piston.

* * * * *